US007716734B2

(12) United States Patent
Birrell et al.

(10) Patent No.: US 7,716,734 B2
(45) Date of Patent: May 11, 2010

(54) SYSTEMS AND METHODS FOR PATTERN MATCHING ON PRINCIPAL NAMES TO CONTROL ACCESS TO COMPUTING RESOURCES

(75) Inventors: Andrew David Birrell, Los Altos, CA (US); Edward P. Wobber, Menlo Park, CA (US); Martin Abadi, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

(21) Appl. No.: 11/133,806

(22) Filed: May 19, 2005

(65) Prior Publication Data

US 2006/0265754 A1    Nov. 23, 2006

(51) Int. Cl.
   *G06F 7/04*      (2006.01)
   *G06F 21/00*     (2006.01)
(52) U.S. Cl. ............................. 726/19; 726/27; 713/182
(58) Field of Classification Search ................. 713/163, 713/182; 726/26, 19, 27
   See application file for complete search history.

(56) References Cited

U.S. PATENT DOCUMENTS

| 5,173,939 | A | 12/1992 | Abadi et al. ................... 380/25 |
| 5,315,657 | A | 5/1994 | Abadi et al. |
| 6,073,234 | A * | 6/2000 | Kigo et al. ................... 713/161 |
| 6,321,262 | B1 * | 11/2001 | Springer ...................... 709/223 |
| 6,408,336 | B1 | 6/2002 | Schneider et al. |
| 6,631,496 | B1 * | 10/2003 | Li et al. ....................... 715/200 |
| 2003/0118087 | A1 * | 6/2003 | Goldthwaite et al. ........ 375/219 |
| 2005/0114677 | A1 * | 5/2005 | Kanai .......................... 713/182 |
| 2005/0160263 | A1 * | 7/2005 | Naizhen et al. .............. 713/167 |

OTHER PUBLICATIONS

Anderson, James, "Computer Security Technology Planning Study," *ESD-TR-73-51, Air Force Systems Command*, Oct. 2002, vol. II, pp. 1-121.
Badger, Lee et al., "A Domain and Type Enforcement UNIX Prototype," *USENIX Computing Systems*, 1996, vol. 9, pp. 47-83.
Fried, Benjamin and Lowry, Andrew, "BigDog: Hierarchical Authentication, Session Control, and Authorization for the Web," *USENIX Second Workshop on Electronic Commerce*, Nov. 18-21, 1996, pp. 165-172.
Gasser, Morrie et al., "The Digital Distributed System Security Architecture," *12th National Computer Security Conference*, 1989, pp. 305-319.
Back, Godmar and Hsieh, Wilson, "Drawing the Red Line in Java", *Proceedings of the Seventh Workshop on Hot Topics in Operating Systems*, Mar. 29-30, 1999, pp. 116-121.

(Continued)

*Primary Examiner*—Eleni A Shiferaw
*Assistant Examiner*—Mohammad W Reza
(74) *Attorney, Agent, or Firm*—Woodcock Washburn LLP

(57) ABSTRACT

Systems and methods are provided for resource access control in computer systems. Our approach includes new techniques for composing and authenticating principals in an access control system. Our principals may comprise information that identifies the role of the user of a computer system, the mechanism by which the user was authenticated, and program execution history. Thus, when a principal makes a request, access control determinations can be made based on the principal's identity. Access control lists may provide patterns that are used to recognize principals, thereby ensuring a level of security without enumerating precise identifiers for all of the possible principles that may request a particular resource.

17 Claims, 8 Drawing Sheets

OTHER PUBLICATIONS

Hunt, Galen C. and Larus, James R., "Singularity Technical Report 1: Singularity Design Motivation," *MSR-TR-2004-105, Microsoft Corporation*, Redmond, Washington, Dec. 17, 2004, pp. 1-4.

Lamson, Butler et al., "Authentication in Distributed Systems: Theory and Practice," ACM *Transactions on Computer Systems*, vol. 10, No. 4, Nov. 1992, pp. 265-310.

Wobber, Edward et al., "Authentication in the Taos Operating System" *ACM Transactions on Computer Systems*, Feb. 1994, pp. 3-32.

In the United States Patent and Trademark Office, Non Final Rejection dated Mar. 23, 2009, 17 pages, in re: U.S. Appl. No. 11/134,760 filed May 19, 2005.

* cited by examiner

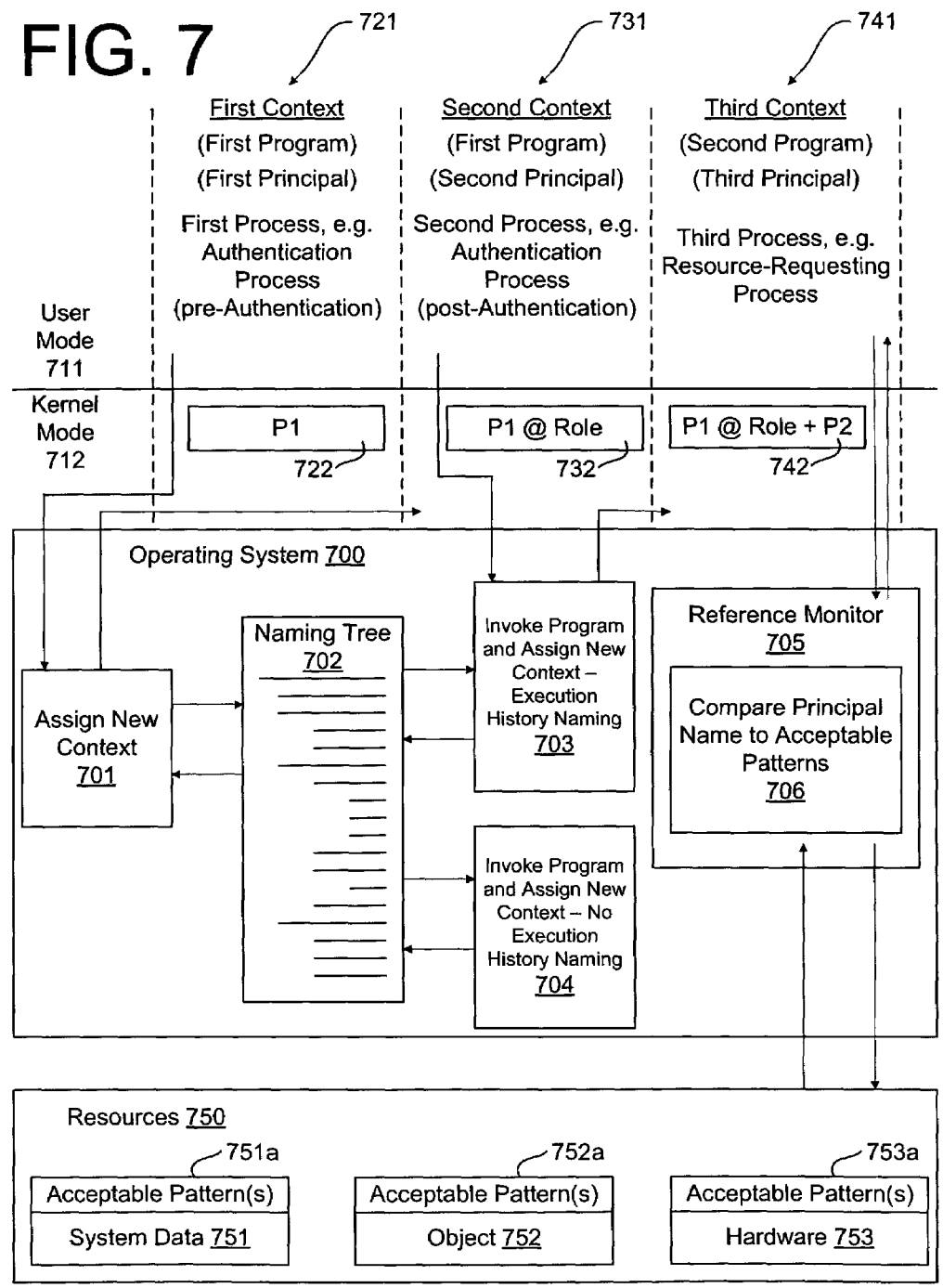

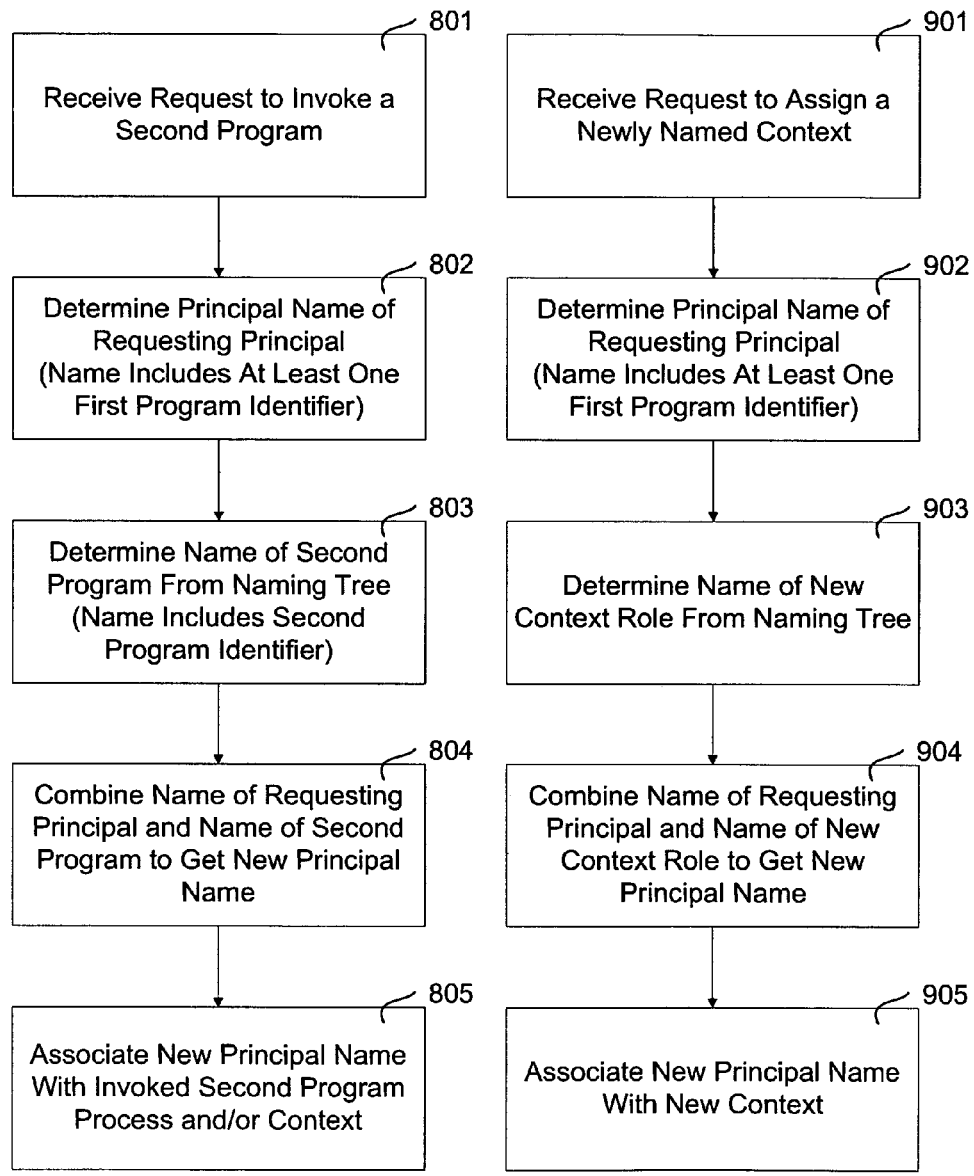

SYSTEMS AND METHODS FOR PATTERN MATCHING ON PRINCIPAL NAMES TO CONTROL ACCESS TO COMPUTING RESOURCES

CROSS REFERENCE TO RELATED APPLICATIONS

This patent application is related to co-pending U.S. patent application Ser. No. 11/134,760 filed concurrently herewith.

FIELD OF THE INVENTION

The invention pertains to access control in computer systems, and in particular to access control in computer operating systems

BACKGROUND OF THE INVENTION

Access control is an important aspect of secure computing. In general, access control involves deciding whether to permit access to a resource. The entity that requests access is referred to as a principal. A resource may be anything that can be accessed from a computer: data, a database, objects, hardware, programs, and so on. Often, the access determination may go beyond simply granting or denying access by determining a form of access. Thus access may be restricted in various ways, so that some principals are granted only limited access.

The access permission logic that determines whether to grant access, and what form of access to grant to a particular principal is sometimes referred to as a "reference monitor." The reference monitor is typically a trusted piece of code that makes all access decisions. The reference monitor is presented with the identity of a principal making a request, the identity of a resource, and the specific form of access desired. The reference monitor then makes the access control decision by deciding whether to accept the proffered identity, and by consulting access control information associated with the resource.

Present access control systems use an arrangement whereby each human user, after login, is identified by a small identifier. Such an identifier may be a Services Set Identifier (SSID) in WINDOWS®, or a User Identifier (User ID) in UNIX-based systems. The access control data for an operation is an access control list kept with a resource, and takes the form of a set whose members are either principals or identifiers for groups. A group, in turn, is a set whose members are either principals or identifiers for further groups. Access is permitted or denied based on the presence of the proffered principal in the closure of the access control list and its constituent groups.

Thus, a user directs an automated process, such as MICROSOFT WORD®; to access a resource, such as a document. The automated process makes such a request by passing the small identifier associated with the user to the reference monitor. Upon receiving the access request from an automated process initiated by a user, the reference monitor will consult the access control list associated with the resource. It will determine if the requesting user is identified. If the user's small identifier can be found on the list—either directly or as part of a group—then the automated process initiated by the user may be allowed to access the requested resource.

The above described access control design unfortunately has many limitations and drawbacks. These have become increasingly critical in recent years as the diversity of the programs installed in computer systems, and the diversity of attacks on computer systems, have increased.

For example, the notion that the principal is identified solely with a logged-in user doesn't allow for expression of important real-world security situations. The human user is not really the entity making an access request. The request is being made by a program. Present designs assume that every program executing in a user's session is acting on the user's behalf and with the user's full trust. That might have been true historically, but it is certainly not true today. For example, while modern computer users most likely approve when MICROSOFT WORD® performs operations on resources that are WORD® documents, but would disapprove if some ad-ware program was doing so. Similarly, the modern user might reasonably object if WORD® was spontaneously accessing the user's QUICKEN® database.

A second example of the limitations and drawbacks of the above-described access control systems stems from the fact that the classical notion of "logged-in" is inflexible. It is all or nothing, and implies that all mechanisms for authenticating a user are equally trusted. Equivalently, it requires that all authentication mechanisms are part of the trusted computing base. In reality, there may be various routes for logging into a computer system, and not all are created equal. Users who log in via a less secure path may not be trusted to access resources to which they might otherwise be entitled.

In view of these and other deficiencies in present access control technologies, the invention herein provides improved systems and methods for making access determinations in computer systems.

SUMMARY OF THE INVENTION

In light of the foregoing deficiencies in the art, we provide new systems and methods for resource access control in computer systems. Our approach includes new techniques for composing and authenticating principals in an access control system, and for granting them access to resources through new access control list variations. A naming tree comprising identifiers for the trusted entities in a computer system such as programs, users, and roles of both can be generated for use in identifying principals. Our principals may comprise information pulled from the naming tree, such as information regarding the role of the computer system user, information regarding the mechanism by which the user was authenticated, and information regarding program executions that preceded an access request—"execution history". Thus, when a principal makes a request, the name of the principal can used to make access control decisions. Access control lists may provide patterns that recognize principals, thereby ensuring a level of security without enumerating precise identifiers for all of the possible principals that may request a particular resource. We show how this supports a variety of access control scenarios. Further aspects and advantages of the invention are described in detail below.

BRIEF DESCRIPTION OF THE DRAWINGS

FIG. 3A illustrates a generalized view of a system that incorporates aspects of the invention. Principals 301-303 composed as described herein can request access to resources 331-335. Each resource 331-335 may have access control information 331a-335a, respectively, configured as described herein. Access permission logic 320 may grant principals 301-303 an appropriate form of access, as determined from the access control information 331a-335a.

FIG. 4 illustrates a generalized view similar to that of FIG. 3A, and also including identifier (ID) generating logic 440 for creating the identifier 400a of a principal 400. ID generating logic 440 may draw upon a naming tree 450 in creating the identifier 400a.

FIG. 7 illustrates an exemplary embodiment wherein an access control system as described herein is incorporated into an operating system 700. The exemplary operating system 700 may operate in conjunction with memory divided into a kernel mode 712 and user mode 711. A first principal can be assigned a first context 721 and name 722. Here, the first principal is a user login process. After the user logs in, a second principal may be launched in a second context 731 that represents the first process (the login process) after successful user login. This second process can be identified by a principal name 732 that incorporates the name from 722, as well as user role information. Any subsequently launched process can be launched in a next context 741, and assigned a name 742 that incorporates elements from 732, in addition to information relating to the newly launched program.

FIG. 8 illustrates a series of exemplary steps in assigning a new principal name to a process.

FIG. 9 illustrates a series of exemplary steps in assigning a new principal name to a process, where it is not desired to represent program execution history in the principal name, and it is instead desired to represent a context role, such as a user role, in the principal name.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Systems and methods for resource access control in computer systems can be improved using techniques for identifying principals with additional relevant information. The various contemplated types of relevant information provide unique advantages which are demonstrated below. Aspects of the invention also provide techniques for grouping of such information into a compound principal identifier comprising identifiers for one or more relevant information types and operators for separating the identifiers in a manner that reflects on the relationship between them. Other aspects relate to systems and methods for collecting information into a naming tree for use in identifying principals, among other potential uses and advantages of the naming tree described herein. Still further, embodiments of the invention may implement techniques provided here for utilizing the described principal identifiers in making access decisions. When principals are identified using some or all of the wide variety of relevant information provided here, a pattern matching method may be employed in access decisions.

For the purpose of clarity in the following detailed description, the invention will be described in the context of a single-host, non-distributed operating system such as a standalone computer running MICROSOFT WINDOWS®, APPLE OSX® or LINUX-based operating systems. Modern computing of course extends to networked and distributing computing environments in which access control systems may also be implemented.

Figure 1:
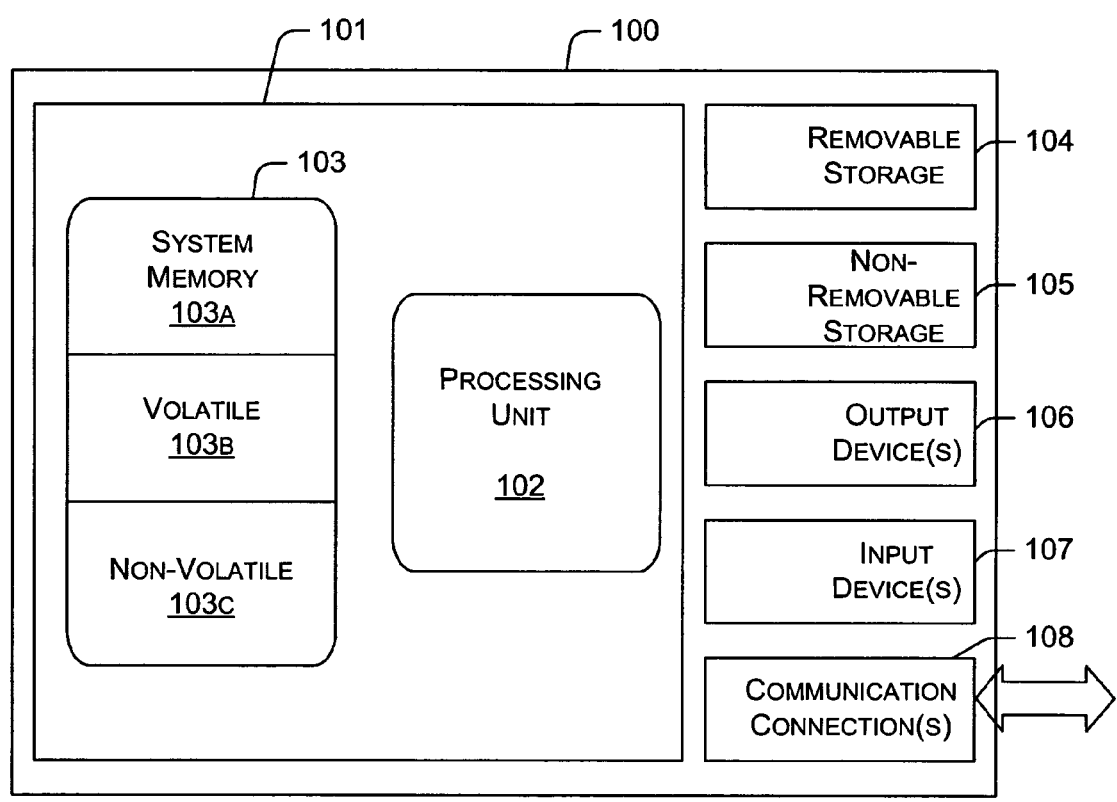
FIG. 1 illustrates a generalized standalone computer system 100 with processing unit 102, memory 103, and other exemplary resources 104-108. Principals may comprise digitized instructions in memory 103A, 103B, 103C, which are executed by processing unit 102. Resources accessed using the techniques provided herein may be data, objects, programs and the like which are stored in system memory 103, as well as other memory and/or hardware such as 104-108.

With reference to FIG. 1, an exemplary computing system 100 suitable for use in connection with the access control system is broadly described. In a basic configuration, computer system 100 typically includes a processing unit 102 and memory 103. Depending on the exact configuration and type of computing system, memory 103 may be volatile 103A (such as RAM), non-volatile 103B (such as ROM, flash memory, etc.) or some combination of the two. Additionally, system 100 may also have mass storage (removable 104 and/or non-removable 105) such as magnetic or optical disks or tape.

Similarly, system 100 may comprise input devices 107 such as a keyboard and mouse, and/or output devices 106 such as a display that presents a GUI as a graphical aid accessing the functions of the computing system 100. Other aspects of system 100 may include communication connections 108 to other devices, computers, networks, servers, and so forth using wired or wireless media.

Volatile memory 103A, non-volatile memory 103B, removable mass storage 104 and non-removable mass storage 105 are examples of computer readable media. Computer readable media may comprise communication media as well as computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computer storage media may be implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium.

The invention may be implemented, at least in part, via computer-executable instructions, such as program modules, being executed by a computer 100. Generally, program modules include routines, programs, objects, components, data structures, etc. that perform particular tasks or implement particular abstract data types.

Computer executable instructions are generally embodied as digital information available to computer 100 on some form of computer readable media. In FIG. 1, for example, system memory 103 may store an operating system and application programs as well as other program modules and program data. Applications and such may be bundled with an operating system, and this arrangement is contemplated in exemplary embodiments of the invention, in which an access control system is included in an operating system. However, it should be noted that aspects of the functionality provided may exist separately and draw upon independent operating system services instead.

An operating system is responsible for initiating processes, and for managing memory for processes. Any process running on an operating system may comprise multiple threads. Typically, a process will be assigned a context, which is a portion of memory 103 which the process is free to use. A process corresponds to a program in that the instructions of the program, which may be stored in various executable files, are carried out by the process.

It should be understood that while embodiments of the invention described herein may be software implementations, the various techniques described herein may also be implemented by replacing hardware components for at least some program modules. Thus, while the methods and apparatus of the present invention, or certain aspects or portions thereof, may take the form of program code in a high level procedural or object oriented programming language, the program(s) can also be implemented in assembly or machine language, if desired. In any case, the language may be a compiled or interpreted language, and combined with hardware implementations.

The invention is operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
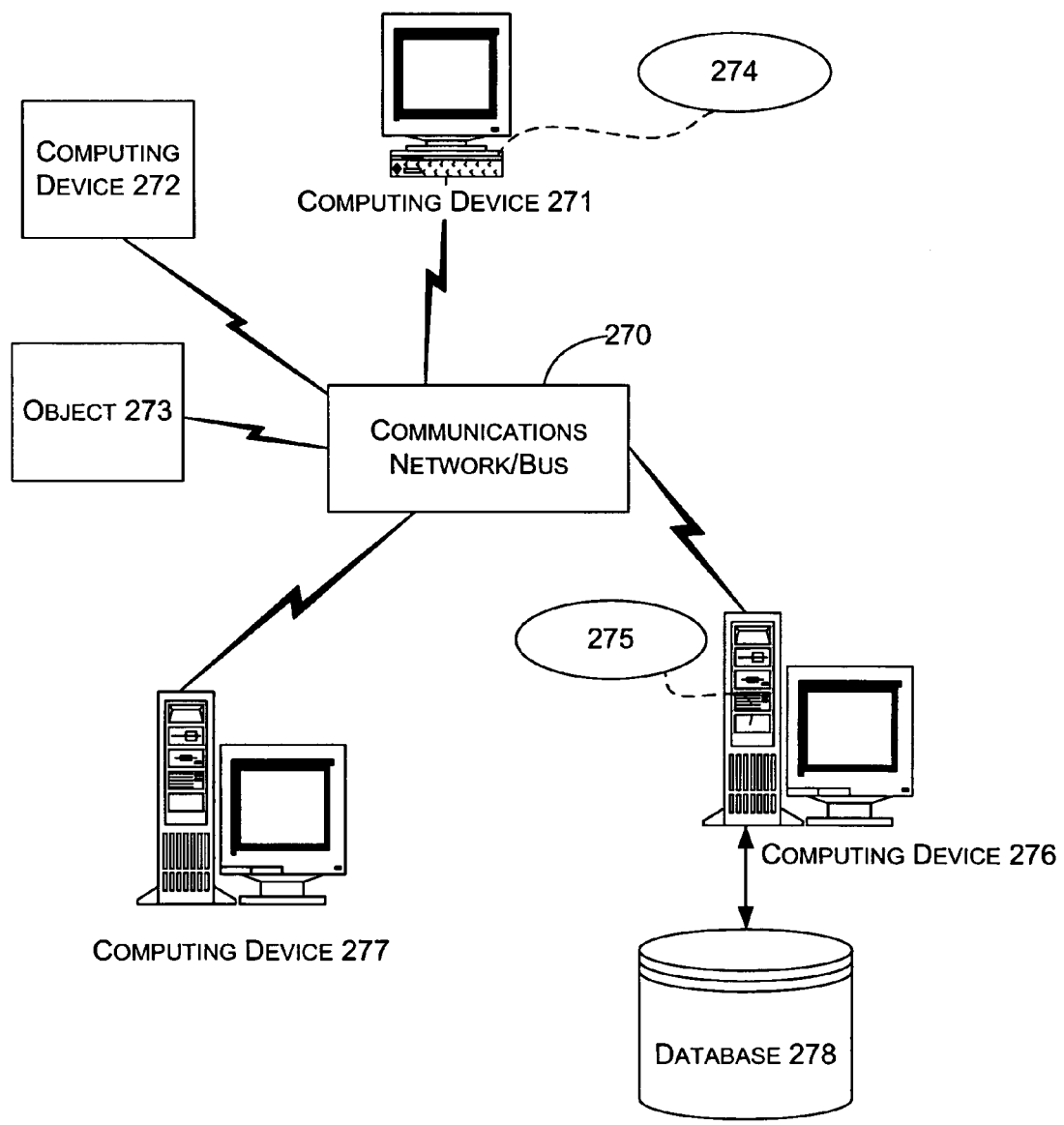
FIG. 2 illustrates a network environment with communications network/bus 270, various computing devices 271, 272, 276, 277, objects 273, 274, 275, and database 278. The access control system and method provided herein may be implemented in the illustrated networked environment. For example, a principal composed as provided herein may reside in a computing device, e.g., 271, while a requested resource may reside at some other location, e.g. 272, 273, or 278, and while a reference monitor for granting and denying access to the requesting principal may reside at yet another location, e.g., 277.

FIG. 2 provides an exemplary networked computing environment that may make use of access control systems and methods provided herein. The network comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 may communicate with another entity 271, 272, 273, 274, 275, 276, 277 and 278 by way of the communications network 270.

Devices on a network communicate with one another utilizing the functionality provided by protocol layer(s). For example, Hyper Text Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

The network may itself comprise other computing entities that provide services to the system of FIG. 2, and may itself represent multiple interconnected networks. Each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

The "client" is a member of a class or group that uses the services of another class or group to which it is not related. In computing, a client may be a process, i.e., roughly a set of instructions or tasks, that requests a service provided by another program. Such service may be, for example, the issuing of a certificate by a certificate issuing system. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Embodiments of the invention may thus address a situation where a principal at a client entity, e.g. 277, requests access to a resource in a database 278, by sending a request to a server entity, e.g. 276. In this scenario, some aspects of the invention may reside on the client 277, while other aspects reside on the server 276 and the database 277. For example, a principal may be named by an operating system executing on client 277 which incorporates the naming tree and various other logic as provided herein. A reference monitor may be located at the server 276 which is configured to make access decisions based on a principal identified as described herein. A resource in the database 278 may bear access control information that specifies permissible identifier patterns in accordance with the techniques of the invention. In short, those of skill in the art will appreciate that the various components of the invention may be configured to reside at any location on the network.

Figure 3A:
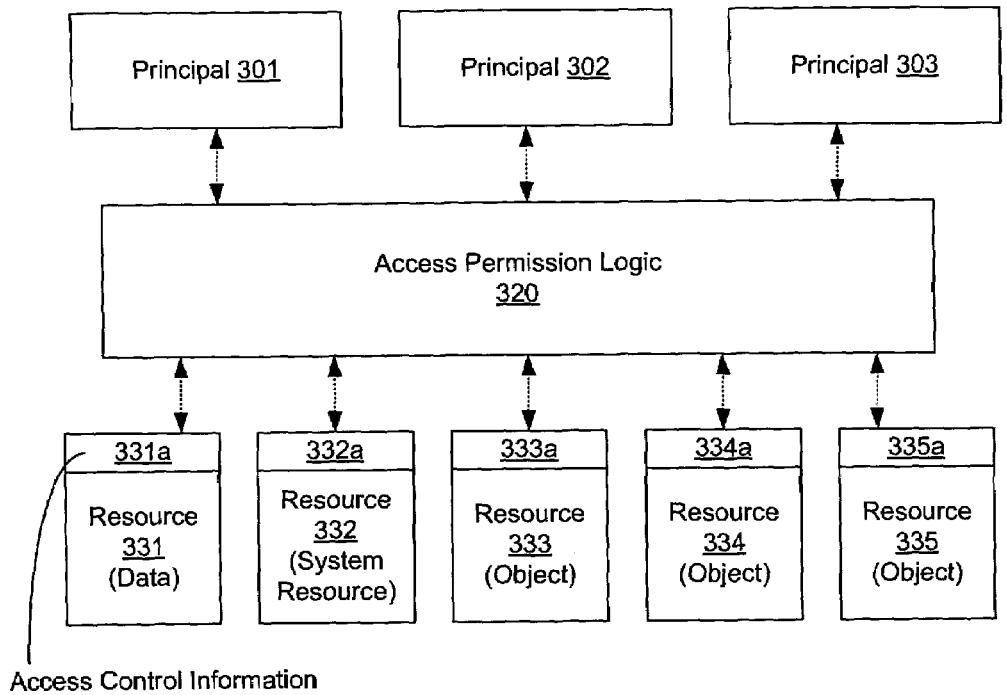

FIG. 3A illustrates a schematic view of an access control system. Principals 301-303 composed as described herein can request access to resources 331-335. Each resource 331-335 may have access control information 331a-335a, respectively, configured as described herein. Access permission logic 320, sometimes referred to as a reference monitor, may grant principals 301-303 an appropriate form of access, as determined from the access control information 331a-335 and the names of principals 301-303.

Figure 3B:
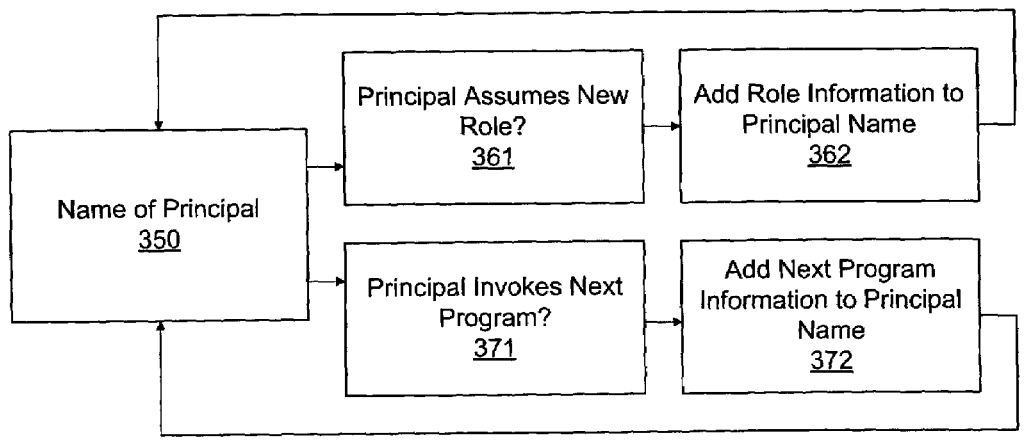
FIG. 3B illustrates a system for naming principals such as 301-303 in FIG. 3A. A principal with a first principal name 350 may either assume a new role 361 or invoke a next program 371. In either case, a new principal is created, and the role information 362 or new program information 372 can be added to the original principal name to create the new principal name.

FIG. 3B illustrates a system for naming principals such as 301-303 in FIG. 3A. A principal with a first principal name 350 may either assume a new role 361 or invoke a next program 371. In either case, a new principal is created, and the role information 362 or new program information 372 can be added to the original principal name to create the new principal name.

FIG. 3B is illustrated as cyclical because each principal may spawn new principals by assuming a new role and/or invoking a next program. Thus, principal names may become quite long if, for example, there is a long chain of invoking programs from a previously invoked principal. More likely, however, many new principals will be spawned from a limited number of principals that are generally responsible for invoking new programs, so principal names will not become excessively long.

Figure 5:
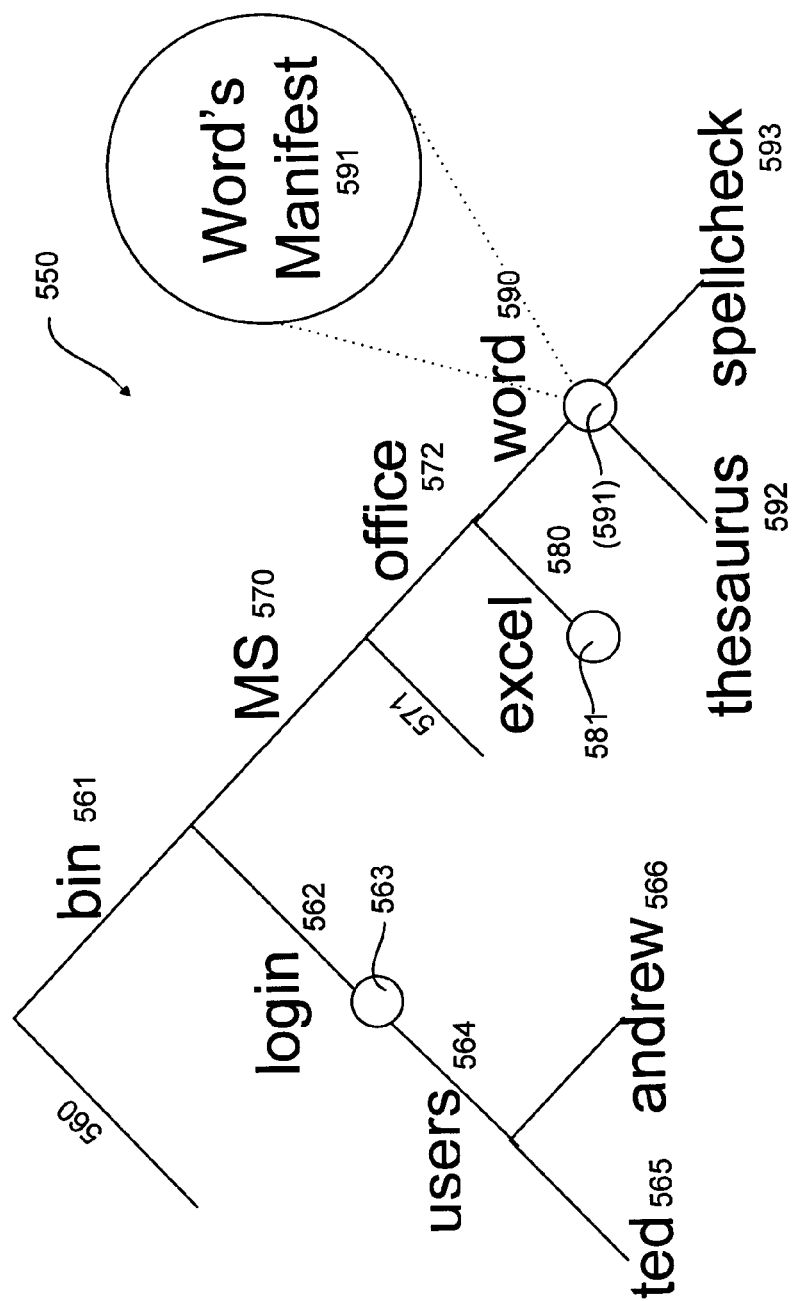
FIG. 5 illustrates an exemplary singly rooted naming tree 560 in which each arc can be labeled with a simple string. Some of the nodes, e.g. 562, 580 in the tree 550 have attached to them a data structure called a manifest 563, 581, the function of which is described in detail herein.

The names of principals 301-303 may thus be composed of exemplary information that describes an initial program plus any roles and subsequent programs in the execution history. Embodiments of the invention may use any sequence of program/role information to name a principal. Information for principal names may be pulled from a naming tree, which is illustrated in FIG. 5.

The various exemplary information that may be used to name a principal, e.g. 301-303, will now be described. First, with reference to the particular program corresponding to the principal, because access requests are actually made by programs, not human users, the principal presented to a reference monitor can include some notion of the program that is executing.

Second, with reference to execution history, the principal presented to a reference monitor can include some notion of the program that provoked that execution, and so on back through the execution history. Information that identifies a program that provoked execution is referred to herein as program execution history information. Sufficient information about program execution history may be retained in a fashion that allows for finer grain access control decisions. For example, one might desire that file write access be granted only to a user when running a specific program. A script interpreter might only be given certain rights when invoked by a known trusted program. A user might have different rights when authenticated via a smart-card login program rather than a password-based login program.

In addition to information about a program that is executing, and program execution history, information pertaining to the circumstances of user login can also be reflected in a principal identifier. In a modern execution environment, principals such as 303 may arise from a console login, from a remote terminal login, from the creation of a background service, batch job or daemon, and so forth. Authentication might be by password, X.509 certificate, smart card, by an ad hoc decision by an application, or by some other authentication technique. These various login mechanisms provide varying degrees of security. These circumstances can be included as part of the identity of the principal 303 presented to the reference monitor 320. When this is done, the reference monitor 320 may base its decisions partly on how a principal 303 was authenticated.

Finally, some notion of the role or roles of a principal 302 can be included in a principal name. For example, a user may login as an administrator with many access privileges, or in some other capacity, such as "employee," "guest," "engineer," "manager," and so forth that may be entitled to some limited set of access privileges. The role can reflect the appropriate set of access privileges. Note that other entities, such as a process, may similarly assume a role, and that such role information may also be reflected in a principal name.

The invention is not limited to use of compound principal names in all situations, nor is it limited to a particular order of information in principal names. Rather, each information type can be used in a principal name if it is desirable to do so under particular circumstances. When a principal makes a request, trust decisions can be made based on the principal's identity. A form of permitted access to a requested resource may then be determined for the principal, or access may be denied.

In summary, one or more of the identity of the authenticated user, the identity of the agency that performed the authentication, and the identity of the program invocations that have brought the computation to its current point can be placed in principal names and considered in access control decisions. As will be seen below, access control lists may then be designed that allow for succinct expression of a wide variety of commonly useful access control decisions.

In some embodiments, an advantage of use of the information types described here is that it allows for separation of the creation of principal names from the policies and mechanisms that led us to trust those principals. Other advantages, discussed in more detail below, comprise the ability to create compound principals formed by two operators that represent authentication and program invocation; and an expressive but straightforward access control list mechanism.

Figure 4:
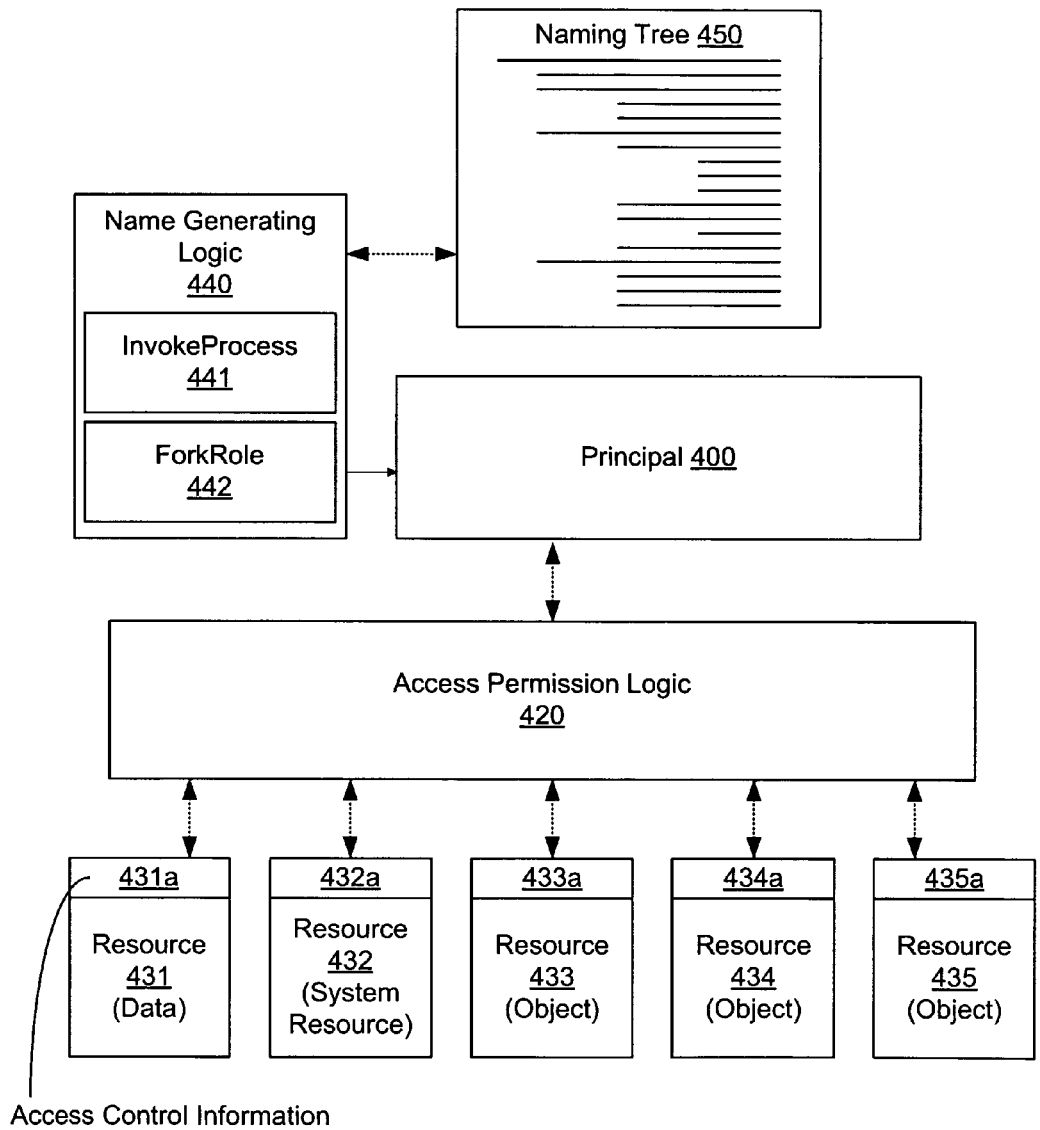

FIG. 4 illustrates a generalized view similar to that of FIG. 3A, and also including principal name generating logic 440 for naming a principal 400. While aspects of the invention generally contemplate generation of principal names as contemplated in FIG. 3B, the role or next program information may be obtained from a variety of sources. The naming tree 450 provides one such source for the information, which provides certain advantages as described below. Thus, while any number of techniques may be used by name generating logic 440 to gather the information that is placed in the principal 400 name, we propose a system involving a naming tree 450 which provides some unique advantages. The naming tree 450 is discussed in detail with reference to FIG. 5.

In some embodiments, name generating logic 440 may be bundled with logic for invoking processes and/or creating a new context for a particular process. The principal naming function is thus integrated into the core logic of an operating system responsible for launching processes and supporting them by providing them with the resources they request. Where this is the case, the logic that invokes a process may also supply a principal name for the process. It is also possible for the invoking and the naming of processes to be independent.

FIG. 4 demonstrates two possible techniques/components for initiating and naming a process, InvokeProcess 441 and ForkRole 442. InvokeProcess 441 applies to situations where a new process is initiated, such as by launching a new application. ForkRole 442 provides a mechanism run the same program as calls the ForkRole 442 component in a new security context. Either or both of these components may be supplied in embodiments of the invention. There are several unique advantages to using them both, as will become apparent below.

To provide an example of the way in which InvokeProcess 441 can assign a principal identifier, assume a first principal identified by the identifier "A." Principal A calls InvokeProcess 441 to initiate a process, for example, a MICROSOFT WORD® process. InvokeProcess can start the MICROSOFT WORD® process and assign a new principal identifier to the MICROSOFT WORD® process. Assume that MICROSOFT WORD® is identified by a string, "B," that can be found in the naming tree. InvokeProcess may assign the identifier "A+B" to the MICROSOFT WORD® process. If the MICROSOFT WORD® process (principal A+B) then initiates another process, identified by string "C" in the naming tree, InvokeProcess 441 can assign the principal identifier "A+B+C" to the new process.

To provide an example of the way in which ForkRole 442 can assign a principal identifier, again assume a first principal identified by the identifier "A." Principal A calls ForkRole 442 to initiate a new instance of itself in a new security context. ForkRole 442 can assign the new process an identifier that incorporates the name of the original principal as well as any role associated with the new security context. For example, if the identifier for the new role is "RR," then ForkRole may assign the identifier "A@RR" to the new principal. To demonstrate this, consider a scenario in which principal A is login process prior to user login. Upon user login, Principal A may call ForkRole to initiate the login process in a new security context associated with the role of the logged in user. To name the process in the new security context, ForkRole 442 can combine the principal identifier "A" with the new role identifier "RR," to create an identifier for the new principal, "A@RR."

The above general descriptions of InvokeProcess 441 and ForkRole 442 will be supplemented with more detailed embodiments below after a closer consideration of the naming tree 450 that may be used in conjunction with various embodiments of the invention.

FIG. 5 represents an exemplary naming tree for use in embodiments of the invention. Naming trees provide advantages in naming principals. In general, information for a principal identifier may be pulled from a naming tree. The information may be an arc in the naming tree. An arc is information that defines a path to a location in a tree. For example, in naming tree 550, an arc to manifest 591 might be 560/bin 561/ms 570/office 572/word 590/manifest 591.

When a principal is to include information about a program, the arc to the program may be included in the principal name. When it is to include information about a user role, an arc to the user role can be included in the principal name. Similarly for any other information to be pulled from a naming tree for inclusion in a principal name. Thus, in some embodiments, program execution history information can be included in principal identifiers. Such principal identifiers may comprise a first arc to the first program in an execution history, then a second arc to a second program in the execution history, and so forth down the chain. When one of the programs authenticates a user, the arc to the authenticated user can be included in the principal identifier.

FIG. 5 illustrates an exemplary singly rooted naming tree 550 in which each arc may be labeled with a simple string. A tree, as that term is used here, refers to a hierarchical structure for organizing data. Thus, for example, in FIG. 5, ms 570 comprises office 572 and some other hypothetical branch 571, and office 572 in turn comprises excel 580 and word 590. This type of data structure is referred to herein as a tree. Note that decisions as to what relatively higher or lower in the hierarchy are made according to some criteria. Embodiments illustrated in FIG. 5 demonstrate one exemplary criteria that may be used to make the invention, but other criteria choices are not ruled out.

Some of the nodes, e.g. 562, 580 in the tree 550 have attached to them a data structure called a manifest 563, 591. The naming tree 550 may represent all entities in a computer system. In some embodiments, the naming tree 550 may be limited to representation of the trusted entities in a system. "Trusted" implies some level of assurance that the entity is not malicious or otherwise undesirable. Programs, users, and roles of both may be listed in the naming tree 550. In some embodiments, cryptographic keys, certificates, and system policy that dictates what entities are trusted and why may be excluded from the naming tree 550 to clearly separate the dual concerns of access control and trust policy.

A manifest, e.g. 591, may specify a particular executable "program", by providing the file names and/or cryptographically secure fingerprints of the constituent parts of the program—its executable, shared libraries, data resources, and so forth. Since the identity of an invoked program becomes part of a principal identifier, program invocation can be a security related operation, and to achieve this programs may be named by paths through the naming tree 550.

The naming tree may also be used to name users, and to name groups from within access control lists.

Among other advantages, use of this naming tree 550 allows separation of the mechanisms and policy for constructing the tree from the mechanisms and policy for running a reference monitor. Both are important parts of the overall security decision, but the separation greatly simplifies the authentication and access control mechanisms.

To construct the tree 550 in the context of a particular trust policy, the decision to install a program purporting to be, for example, MICROSOFT WORD® can entail verifying the identity of the entity with a trusted party such as an authenticated administrator. The authenticated administrator may inspect certificates (such as X.509) and agree that the proffered bits really deserve to be given such a trusted name. Once that decision has been made, WORD® can be included in the appropriate location 590 in the tree 550. Similarly, the presence of "ms" in the hierarchy might represent the publisher MICROSOFT® and dictate that certified MICROSOFT® applications can inhabit this part of the namespace. This is up to system policy.

The presence of the resulting manifest 591 at the node named, e.g., "bin/ms/office/word" 590, makes the administrator's decision clear, and we can use this in subsequent authentication and access control decisions.

Nodes in the tree can have content, and that a manifest, e.g. 563 may be viewed as part of the content of a node 562. Such a node can also have children 565, 566. Thus, in FIG. 5 the arc defined by 560/bin 561/login 562 has both a manifest 563 and a child 564 ("users"). "users 564/ted 565" and "users 564/Andrew 566" are roles of "560/bin 561/login 562". Similarly, "thesaurus 592" and "spellcheck 593" are roles of 560/bin 561/MS 570/office 572/word 590. The dotted lines signify a magnification of the node 591 under "word" 590, which contains word's manifest. The naming tree may itself be considered a resource, and therefore have its own access control lists attached to it, to specify which principals can modify which parts of the tree.

Once a naming tree such as that of FIG. 5 is constructed, it can be used to name principals, to invoke new processes, or both. Naming may entail obtaining information from the tree and combining it with other information, such as a name of a previously executing principal as described above with reference to operation of "InvokeProcess." Note that there need not necessarily be an actual data structure in a computer system that represents the tree. In some embodiments, the tree is never actually fully constructed. Instead, names are organized into a tree, if one wishes, but they are never actually organized that way in memory.

The various identifiers that are conjoined in a principal identifier may be separated using operators. We provide a small set of exemplary operators that can be used to conjoin elements of the naming tree to form principal identifiers. In the embodiment provided here, operators may relate directly to security-sensitive system operations such as "fork process" and "fork role". Additional operators, different operators, and different symbols for the operators described herein may be used in alternative embodiments of the invention.

In one embodiment, a principal name can be a string constructed from arcs in the naming tree 550 and operators "/", "@", and "+", according to the following grammar—the example below uses standard BNF notation, plus the operators defined herein:

Manifest Name: MN=Arc|MN "/" Arc
Relative Role: RR=Arc|RR "/" Arc
Role: R=MN|R "@" RR
Principal: P=R|P "+" R The system provides exactly two operations that affect principals:

InvokeProcess(MN)
ForkRole(RR)

In such an embodiment, when "InvokeProcess" runs a program, its argument "MN" is a manifest name, which is a path from the root 500 of the naming tree 550 to the manifest of the desired program, e.g. 520. The system finds the named manifest 520, loads the appropriate data into a new security context, and initiates its execution. When the principal that calls InvokeProcess is "P", then the new security context may run as principal "P+MN".

In other words, occurrences of the "+" operator within a principal name represents the history of program invocation that resulted in the currently executing program.

There may be variations of InvokeProcess. In one variation, when a manifest is marked as a "service", or otherwise flagged, then the new security context may run as the principal "MN", independently from the identifier of its invoker. This provides a technique for excluding program execution history from a principal identifier, which may prove useful in some situations.

As described generally above, "ForkRole" may run the same program as calls it, but in a new security context. In this specific embodiment, its argument "RR" is a path relative to the program's manifest name. When the principal that calls ForkRole is "Q", then the new security context runs as principal "Q@RR".

In other words, occurrences of the "@" operator within a principal name indicate where a program has decided to adopt a distinguished role, relative to its manifest. This indication says nothing about whether the role is more or less privileged—that has meaning only to the extent that access control lists grant more or less access to the new principal name.

One critical use of ForkRole is to indicate when a program makes an authentication decision. For example, the system might run a console login program by invoking the manifest "bin/login" as a service, thus executing as principal "bin/login". When the console login program has received a satisfactory user name "andrew" and password from the console, it will use ForkRole to start running itself as "bin/login @ andrew", then use InvokeProcess to run Andrew's initial command shell "bin/bash", which will then be executing as the principal "bin/login @ andrew+bin/bash".

Similarly, we might run the manifest "bin/sshd" to listen for incoming Secure Shell ("SSH") connections. After satisfactory authentication through the normal SSH public-key mechanisms it might adopt the role "bin/sshd @ andrew" then run the command shell, which would execute as "bin/sshd @ andrew+bin/bash".

In these two scenarios, if "bash" decides to run "cat" (whose manifest is named "bin/cat") and cat tries to open a file, this would result in an access request to the file system from either the principal "bin/login @ andrew+bin/bash+bin/cat" or the principal "bin/sshd @ andrew+bin/bash+bin/cat" respectively. The reference monitor for the file system would then consult the access control list on the requested file to decide whether the given principal should be granted access.

Note that nowhere in this scenario has the system trusted any of the programs involved: login, sshd, bash, or cat. All the system did was to certify the program invocations involved, and that bin/login and bin/sshd chose to adopt the role "andrew". In this design trust need only occur in constructing the naming tree 550, i.e. trusting that the programs really deserve their given names, and as a result of the way in which we write access control lists, which embody our access control decisions.

Figure 6:
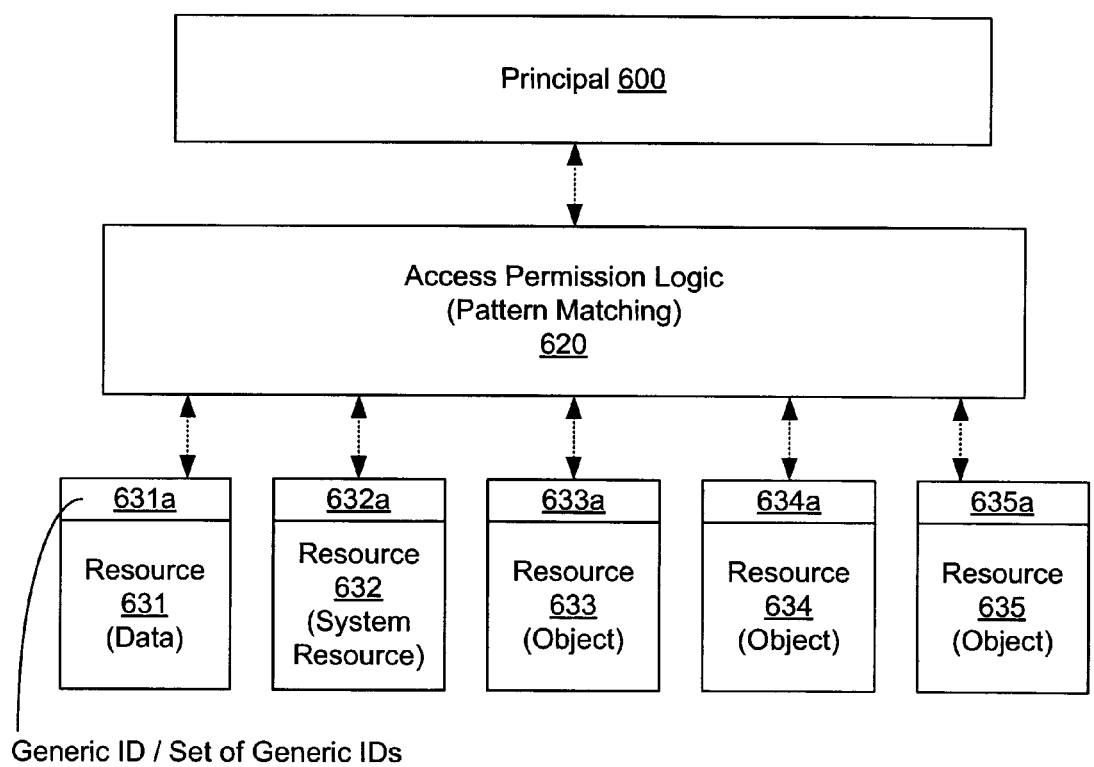
FIG. 6 illustrates a generalized view similar to that of FIG. 3A, for the purpose of demonstrating pattern matching techniques. A specific principal name 600 may be compared against criteria specified in a generic ID or set of generic IDs, e.g., 631a associated with a resource 631. If the specific principal name 600 meets the specified pattern criteria, then principal 600 may be granted an appropriate form of access to resource 631.

FIG. 6 illustrates a generalized view similar to that of FIG. 3A, for the purpose of demonstrating pattern matching techniques. A specific principal name 600 may be compared against criteria specified in a generic ID 631a, or set of generic IDs associated with a resource 631. If the specific name 600 meets the specified pattern criteria in 631a, then principal 600 may be granted an appropriate form of access to resource 631.

Pattern matching is useful because embodiments of the invention may include significant extra information within the principal name 600, causing proliferation of the variety of principal names that may arise. It can become untenable to maintain lists of principal names that are permitted to access resources. To resolve this issue, we can express in the access control data 631a-635a a wide variety of constraints on the acceptable principals, based on the wider variety of information now included in our principal's names. However, some embodiments may maintain security as well as usability by expressing the decisions that can be made by this more general mechanism in a sufficiently simple language so they make sense to the people who read and write the access control lists 631a-635a.

With compound principal names such as those we propose above, having an access control list ("ACL") be merely a set of principal names may not provide sufficient expressive power. For example, we might want to permit access to a user while executing within a particular set of programs, or when authenticated by some particular set of programs (e.g., bin/login or bin/sshd, but not bin/ftpd); or we might want to give access to a program regardless of its user. Embodiments of the invention may thus use an ACL design in 631a-635a that is no longer just a set of principal names. Instead it is a pattern, or a set of generic identifiers, that can be used by pattern matching logic 620 to recognize specific principal names such as 600.

The exact pattern recognition language used may vary. We present here a pattern recognizer that is a specialized subset of regular expressions. Obviously, more or less complex recognizers are possible, depending on your judgment about the range of decisions that you want to be able to express.

An ACL 631*a* may be a string constructed from arcs in the naming tree and operators as follows:

Atom=Arc|"/"|"@"|"+"
Item=Atom|"."|"(" ACL ")"|Item "*"|"{" GroupName "}"
GroupName=Arc|GroupName "/" Arc
Seq=Item|Seq Item
ACL=Seq|ACL "|" Seq The matching rules are similar to those for conventional regular expressions, as follows:

Any Atom matches itself

"." matches any single Arc (explicitly excluding "/", "@", and "+")

"(ACL)" matches ACL

"Item *" matches zero or more sequential occurrences of Item (greedily)

"{GroupName}" matches whatever is matched by the contents of the node GroupName in the naming tree "Seq Item" matches Seq followed immediately by Item "ACL|Seq" matches either ACL or Seq A principal "P" matches an ACL "A" if the string P matches the regular expression that is the contents of A. The match must be complete—all of P, not just a sub-string of it.

"GroupName" provides a mechanism for sharing parts of the recognition machinery amongst multiple ACL's. We place groups within the same naming tree as manifests and role names, with the same assumption that their presence there reflects a trust decision made by a suitable administrator. Recursively defined groups are not permitted.

A reference monitor 620 may grant P its requested access to an object iff P matches the relevant ACL. In doing so, the reference monitor is just performing string manipulation on the principal name and the ACL contents—it doesn't need to use the naming tree itself, except to read referenced groups.

FIG. 7 illustrates an exemplary embodiment wherein an access control system as described herein is incorporated into an operating system 700. The exemplary operating system 700 may operate in conjunction with memory divided into a kernel mode 712 and user mode 711.

FIG. 7 can be best understood by assuming that the upper portion of the figure, namely elements 721, 731, and 741 reflect contexts in memory which are created one after the other, from left to right. Thus, first context 721 is created first, second context 731 is created second, and so on. In the meantime, the operating system 700 in the bottom half of the figure provides a set of fixed components that are drawn upon by the various processes in contexts 721, 731, 741. Each context 721, 731, 741 may have a user mode portion in 711 and a kernel mode portion in 712. The kernel mode portion is under exclusive control of the operating system 700, while the user mode portion is under control of the various processes.

A first principal can be assigned a first context 721 and principal name 722. The principal name is the information that would be passed to the reference monitor should the principal in context 721 request a resource from 750. Here, the first principal is a user login process, which provides for convenient explanation of this example. When a user logs in, the process in 721 may call ForkRole 701, referred to in the figure as "assign new context." This component can both assign a new context 731 and provide a principal name 732 for the newly created principal. The second principal may be launched in a second context 731 that represents the first process from context 721 after successful user login. This second process can be identified by a principal name 732 that incorporates the name from 722, as well as user role information. The ID from 722 can be retrieved from 722, while the user role information can be retrieved from the naming tree 702.

A next process may be launched, in context 741, using the exemplary InvokeProcess 703 component as described above. InvokeProcess 703 is described in the figure as "invoke process and assign new context-execution history naming." Any subsequently launched process, for example a MICROSOFT WORD® process, can be launched in a next context 741, and assigned a name 742 that incorporates elements from 732, in addition to information for the newly launched program. Again the elements from 732 can be retrieved from 732, while the name for the newly launched program can be retrieved from the naming tree 702. As described above, the naming tree 702 may also play a role in invoking this next process, in that the executable for the corresponding program is located via the naming tree 702.

"Invoke process and assign new context-no execution history naming" 704 is the InvokeProcess variation described above. This variation 704, if called, could invoke a new process, such as a MICROSOFT WORD® process, but without including program execution history information in the corresponding principal name 742.

When a principal, such as the process in 741, requests a resource, it can pass a request along with its principal name 742 to the reference monitor 705. The reference monitor 705 can locate the requested resource from among all available system resources 750. The requested resource may be any resource available to the computer system, including but not limited to system data 751, an object 752, and hardware 753. The reference monitor can retrieve the ACL, e.g. 751*a*, 752*a*, 753*a* from the desired resource. If the ACL specifies a pattern for acceptable principal names, the reference monitor 705 can perform a pattern matching operation to determine if the principal name 742 matches pattern parameters in, for example, 752*a*. In some embodiments, a number of patterns may be specified in 752*a* which correspond to different access privileges. A level of access may be determined by logic for pattern matching 706 as described above.

FIG. 8 illustrates a series of exemplary steps in assigning a new principal name to a process. The steps of FIG. 8 can be understood with reference to FIG. 7 and corresponding description, above. First, an operating system may receive a request 801, e.g. a request from a first program or corresponding process, to invoke a second program. Next, the operating system may determine the principal name of the requesting principal 802. In many embodiments, the request may bear the identity of the requesting principal, making this determination a simple matter. Next, the name of the second program may be determined from a naming tree 803 or other information source such as the information passed to an invocation process. The name of the second program may be generated with reference to the naming tree as described above. The requesting principal and the name of second program may be combined to produce a new principal name 804. The identifiers may be combined using operators as described above. Finally, the operating system may associate a new principal name, namely the compound name generated by adding the naming tree information with information from the requesting principal, with the newly created principal 805.

FIG. 9 illustrates a series of exemplary steps in assigning a new principal name to a process, where it is not desired to represent program execution history in the principal name, and it is instead desired to represent a context role, such as a user role, in the principal name. First, an operating system may receive a request 901, e.g. a request from a first program or corresponding process, to assign a new context, e.g. a context associated with a new role. Next, the operating system may determine the principal name of the requesting principal 902. In many embodiments, the request may bear the identity of the requesting principal, making this determination a simple matter. Next, the name, or identifier, of the role to be associated with the new context may be determined from a naming tree 903. The name of the new role may be generated with reference to the naming tree as described above. The name of the requesting principal and the name of new role may be combined to produce a new principal name 904. The names may be combined using operators as described above. Finally, the operating system may associate a new principal name, namely the compound name generated by adding the naming tree information with information from the requesting principal, with the newly created principal 905.

A number of usage examples are instructive in illustrating embodiments of the invention. To keep the examples legible, assume that a naming tree contains the following groups, named with single arcs:

path=.(/.)*
 role=(@{path})*
 app={path}{role}
 trusted=bin/(login|sshd)
 authors=Andrew|Martin|Ted
 office=bin/ms/office/./
 good=bin/cmd.exe|{office}

The following ACL is similar to the baseline semantics of existing systems: give access to an explicitly named user, if authenticated by a trusted program:

{trusted}@ Ted (+{app})*

More precisely, the above ACL permits access from any program invoked (directly or indirectly) from one of our trusted authentication programs, provided that the authentication program has adopted the role "Ted". In contrast with existing systems, however, the choice of which authentication programs should be trusted is made in the ACL. We could trust different sets of authentication programs for different objects or for different users.

Our next example gives access from any of a specific set of programs, regardless of the user who invoked them:

({app}+)*{office}{role}

One might use such an ACL, for example, to allow MICROSOFT OFFICE® applications to access some auxiliary files, regardless of who is running the applications, while preventing users doing anything else with the auxiliary files.

Our final example gives access when authenticated by a trusted program as a member of "authors", but only when the entire invocation chain of programs is acceptable:

{trusted}@{authors}(+{good})*

The use of additional information in principal names as suggested herein, along with the naming tree and ACL pattern matching techniques, allows a number of auxiliary advantages for access control systems. Support for separation of the policy and mechanisms for certifying programs and groups from the day-to-day authentication and access control mechanisms is one important advantage that may be accomplished in some implementations of the invention. Second, some embodiments of the invention may consist of just two operators for composing principals, providing sufficient expressiveness while retaining simplicity. Third, the particular information incorporated into principals by embodiments of the invention can avoid requiring that the system trust particular authentication programs. Finally, when ACLs employ pattern recognition, compact expression of sophisticated access control decisions is supported, which simultaneously allows broad use of the expressive power expressiveness of our principals. The systems and methods provided here thus allow for authentication and access control in a modern operating system, suitable for the more stringent requirements of a modern security posture in a world with diverse software.

Finally, it should be emphasized once again that although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

We claim:

1. A computer system comprising:
a processing unit; and
system memory which stores an operating system comprising a reference monitor incorporated as part of the operating system to control access by principals to computing resources of the computer system, the reference monitor comprising program instructions that are executable by the processing unit to perform a pattern matching process to determine if a principal identifier, which is associated with a principal requesting access to a computing resource, matches a pattern for acceptable principal identifiers associated with said computing resource,
wherein said principal is a process, and wherein said principal identifier is maintained as a tree data structure comprising identifiers for trusted entities in the computer system, said tree data structure comprising at least one of a program identifier, a user identifier, or a role identifier,
wherein said principal identifier comprises an expression of an execution history of the principal associated with said principal identifier,
wherein said pattern for acceptable principal identifiers includes pattern parameters that specify a required program identifier and a required user identifier, and
wherein said principal is granted access to said computing resource if said principal identifier matches pattern parameters specified in said pattern for acceptable principal identifiers.

2. The computer system of claim 1 wherein said principal identifier comprises two or more of the program identifier, the user identifier, and the role identifier.

3. The computer system of claim 2 wherein said principal identifier further comprises one or more operators between said program identifier, user identifier, and role identifier.

4. The computer system of claim 1 wherein said computing resource is the tree data structure.

5. The computer system of claim 1 wherein said computing resource is a hardware resource.

6. The computer system of claim 1 wherein said computing resource is an executable software resource.

7. A computer readable storage medium having stored thereon a plurality of computer-executable instructions that are executable by a computer to implement an access control system for controlling access to computing resources, said computer-executable instructions comprising:

computer executable instructions for generating compound principal identifiers that are associated with principals that may request access to at least one computing resource, wherein said principals are processes and said compound principal identifiers are maintained as a tree data structure comprising identifiers for trusted entities in the computer system, said tree data structure comprising at least one of a program identifier, a user identifier, or a role identifier, and wherein a principal identifier comprises an expression of an execution history of the principal associated with said principal identifier;

computer executable instructions for associating at least one access control pattern with at least one computing resource, wherein said access control pattern matches at least one compound principal identifier of a principal, without precisely specifying all identifiers in said matching compound principal identifier; and computer executable instructions for matching the access control pattern with said matching compound principal identifier of said principal to allow access by said principal to said at least one computing resource.

8. The computer readable storage medium of claim 7 wherein said access control pattern comprises at least one independent sub-pattern.

9. The computer readable storage medium of claim 8 wherein said sub-pattern is located at a node in a tree comprising a plurality of compound principal identifiers.

10. The computer readable storage medium of claim 7 wherein said computer executable instructions for generating compound principal identifiers include computer executable instructions for determining an arc in a tree, wherein said arc defines a path to a location of a program.

11. The computer readable storage medium of claim 7 wherein said access control system is incorporated into a computer operating system.

12. The computer readable storage medium of claim 7 where the at least one computing resource is a digital file.

13. The computer readable storage medium of claim 7 where the at least one computing resource is a hardware resource.

14. A computer system comprising:

a processing unit; and system memory which stores an operating system comprising program instructions that are executable by the processing unit for controlling access by principals to computing resources of the computer system, wherein said principals are processes, wherein controlling access comprises acts of:

maintaining a tree data structure that is used for assigning identifiers to principals, said tree data structure comprising at least one of a program identifier, a user identifier, or a role identifier, wherein a principal comprises an expression of an execution history of the principal associated with said principal identifier;

generating a principal identifier at least in part by adding said at least one program identifier to an existing principal identifier; and performing a pattern matching process to determine if a principal identifier, which is associated with a principal requesting access to a computing resource, matches a pattern for acceptable principal identifiers associated with said computing resource; and granting said principal access to said computing resource if said principal identifier matches the pattern for acceptable principal identifiers.

15. The computer system of claim 14 wherein said role identifier is added to the existing principal identifier when the existing principal assumes a new role.

16. The computer system of claim 14 wherein an identifier of a program is combined with the existing principal identifier when the existing principal invokes said program.

17. The computer system of claim 14 wherein said computing resource is the tree data structure.

\* \* \* \* \*

UNITED STATES PATENT AND TRADEMARK OFFICE
CERTIFICATE OF CORRECTION

Page 1 of 1

PATENT NO.       : 7,716,734 B2
APPLICATION NO.  : 11/133806
DATED            : May 11, 2010
INVENTOR(S)      : Andrew David Birrell et al.

It is certified that error appears in the above-identified patent and that said Letters Patent is hereby corrected as shown below:

In column 18, line 22, in Claim 14, after "identifier;" delete "and".

Signed and Sealed this
Twenty-fourth Day of May, 2011

David J. Kappos
*Director of the United States Patent and Trademark Office*